(12) United States Patent
Robertson

(10) Patent No.: US 6,904,474 B1
(45) Date of Patent: Jun. 7, 2005

(54) USING WRITE REQUEST QUEUE TO PREVENT BOTTLENECKING ON SLOW PORTS IN TRANSFER CONTROLLER WITH HUB AND PORTS ARCHITECTURE

(75) Inventor: Iain Robertson, Bedfordshire (GB)

(73) Assignee: Texas Instruments Incorporated, Dallas, TX (US)

( * ) Notice: Subject to any disclaimer, the term of this patent is extended or adjusted under 35 U.S.C. 154(b) by 65 days.

(21) Appl. No.: 09/615,132

(22) Filed: Jul. 13, 2000

(30) Foreign Application Priority Data

Jul. 16, 1999 (GB) .............................. 9916706

(51) Int. Cl.⁷ .............................................. G06F 13/00
(52) U.S. Cl. ............................. 710/33; 710/21; 710/22; 710/39; 710/40; 710/316
(58) Field of Search .......................... 710/21, 22, 33, 710/39, 40, 316

(56) References Cited

U.S. PATENT DOCUMENTS

| | | | | |
|---|---|---|---|---|
| 5,138,611 A | * | 8/1992 | Carn et al. ................... | 710/316 |
| 5,333,276 A | | 7/1994 | Solari ......................... | 395/325 |
| 5,581,790 A | | 12/1996 | Sefidvash .................... | 395/854 |
| 5,619,544 A | | 4/1997 | Lewis et al. ................. | 375/377 |
| 5,629,950 A | * | 5/1997 | Godiwala et al. ............ | 714/805 |
| 5,630,077 A | * | 5/1997 | Krein et al. ................. | 710/113 |
| 5,687,390 A | | 11/1997 | McMillan, Jr. ............. | 395/825 |
| 5,850,571 A | | 12/1998 | Odom et al. ................. | 395/847 |
| 5,894,481 A | * | 4/1999 | Book ........................... | 370/412 |
| 5,909,594 A | * | 6/1999 | Ross et al. ................... | 710/20 |
| 5,924,112 A | * | 7/1999 | Barber et al. ................ | 711/100 |
| 6,032,205 A | * | 2/2000 | Ogimoto et al. ............. | 710/33 |
| 6,098,109 A | * | 8/2000 | Kotzur et al. ............... | 709/249 |
| 6,493,347 B2 | * | 12/2002 | Sindhu et al. ............... | 370/401 |
| 6,606,326 B1 | * | 8/2003 | Herring ....................... | 370/412 |
| 6,629,166 B1 | * | 9/2003 | Grun ........................... | 710/36 |

FOREIGN PATENT DOCUMENTS

| | | | |
|---|---|---|---|
| GB | 9806474.4 | 3/1998 | .......... H04L/12/56 |
| GB | 2 325 824 A | 12/1998 | |

* cited by examiner

Primary Examiner—Kim Huynh
Assistant Examiner—Eron Sorrell
(74) Attorney, Agent, or Firm—Robert D. Marshall, Jr.; W. James Brady, III; Frederick J. Telecky, Jr.

(57) ABSTRACT

A data transfer technique between a source port and a destination port of a transfer controller with plural ports. In response to a data transfer request (401), the transfer controller queries the destination port to determine if it can receive data of a predetermined size (402). If the destination port is not capable of receiving data, the transfer controller waits until said destination port is capable of receiving data (412). If the destination port is capable of receiving data, the destination port allocates a write reservation station to the data (403). Then the transfer controller reads data of the predetermined size from the source port (404) and transfers this read data to the destination port (405). The destination port forwards this data to an attached application unit, which may be memory or a peripheral, and then disallocates the write reservation station freeing space for further data transfer (406). This write driven process permits the transfer controller hub to service other data transfers from a fast source without being blocked by a slow destination.

19 Claims, 7 Drawing Sheets

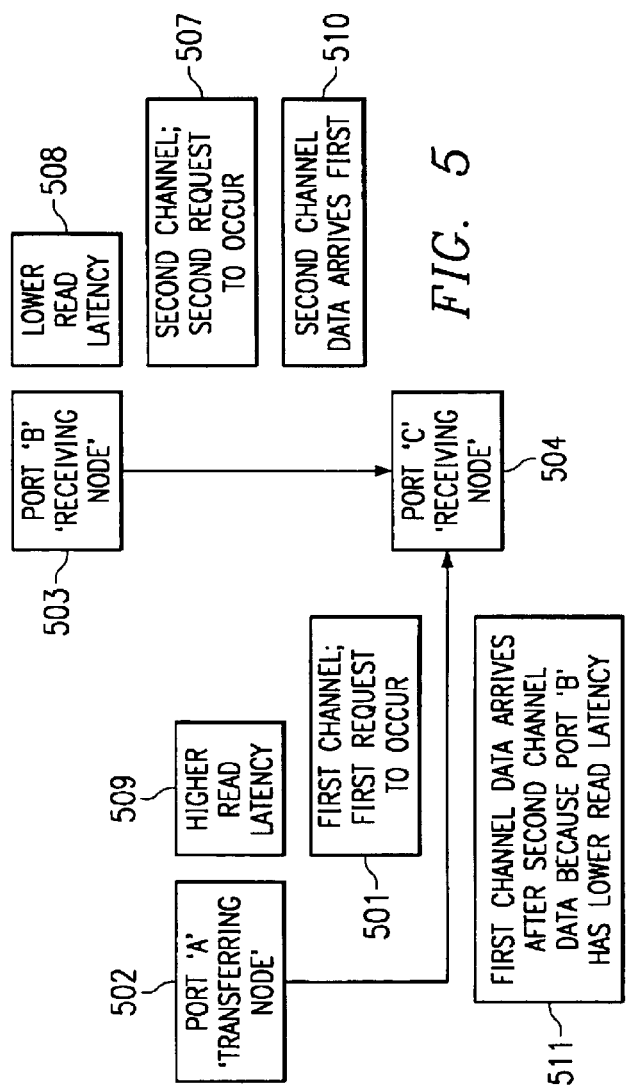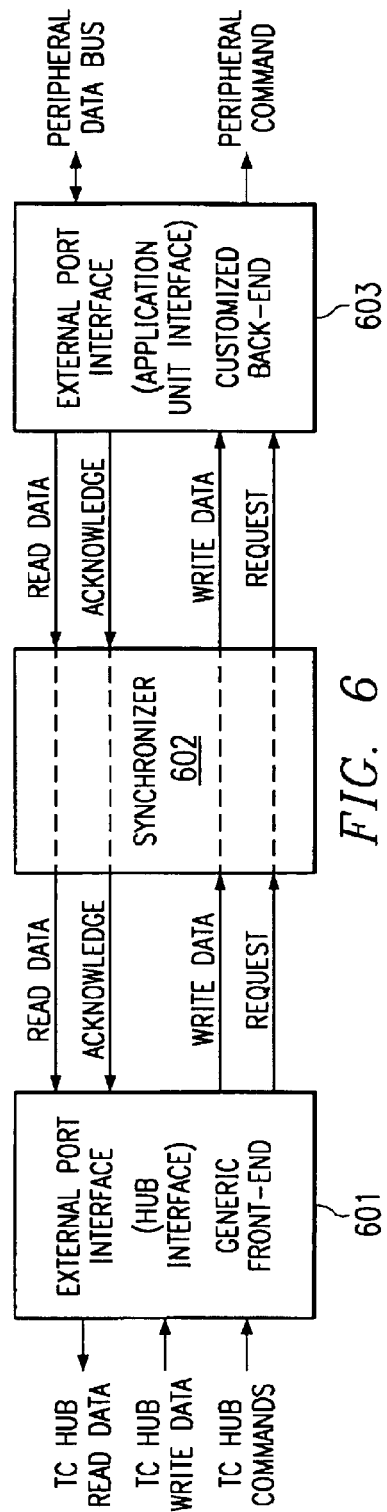

USING WRITE REQUEST QUEUE TO PREVENT BOTTLENECKING ON SLOW PORTS IN TRANSFER CONTROLLER WITH HUB AND PORTS ARCHITECTURE

TECHNICAL FIELD OF THE INVENTION

The technical field of this invention is digital device functional blocks which relates generally to the area of microprocessor design and relates more specifically to the area of digital signal processor devices. The techniques, described, however, are applicable even more generally to digital devices performing data exchange between ports of a multiple port device.

BACKGROUND OF THE INVENTION

The present invention deals with the write request queue as applied to the transfer controller with hub and ports architecture. The transfer controller with hub and ports is the subject of U.K. Patent Application serial number 9909195.9 filed Apr. 16, 1999 (TI-28983UK) having a U.S. counterpart application, now U.S. Pat. No. 6,496,740. The transfer controller with hub and ports is a significant basic improvement in data transfer techniques in complex digital systems and provides, along with many other features, for the uniform implementation of port interfaces at the periphery of such systems. Some of these ports may be slow, i.e. they may have relatively low throughput. Others may be relatively fast, having the throughput and speed of a current central processing unit.

Some bottlenecks in data transfer operations can result from this disparity of performance within the device or system ports. To clarify the problem solved by the present invention, it is helpful to review the characteristics, architecture, and functional building blocks of the transfer controller with hub and ports. While direct memory access (DMA) is a powerful tool in a digital signal processor system, they have their limitations. The fundamental limitation of a conventional direct memory access engine is that adding additional channel capacity requires additional hardware (in general, a replication of a complete channel). Some optimizations can be made in this area, such as sharing registers between multiple channels, but in general, the following rule holds: N-channels costs N times as much as a single channel.

Conventional direct memory access techniques initiate reads from a source, and subsequently pass the data on to a destination. The source transfers will initially proceed at full rate. However, if the source has higher data transfer bandwidth than the destination, this data will backlog within the direct memory access engine. This will eventually slow the rate at which source transfers are issued. Thus the source data transfer bandwidth is effectively restricted to that of the destination. If another channel has a different source port and a different destination port, there are no conflicts using the conventional read driven approach. However, if the source port of the other channel is the same, the other channel could not be processed. This makes for inefficiency. In a device that supports only one transfer at a time, this is acceptable. However, the transfer controller with hub and ports device supports multiple concurrent transfers and other provisions must be made. A normal transfer process in the known art starts by reading data from the source and then writing it to the destination. The source read drives the process in that it occurs first, and everything follows as a consequence.

With a conventional read driven approach, the source will start reading data which will be passed to the destination. However, if the destination is slow, a backlog of data waiting to be written will eventually cause the source read process to stall because it will not have anywhere to put the data read. With only one channel this is acceptable, but if there are multiple channels, conflicts occur. The source for this channel is stalled and cannot respond to more read requests. However, it is desirable to be able to service a different channel instead.

These basic limitations to conventional data transfer techniques led to the initial development of the transfer controller with hub and ports. The transfer controller with hub and ports is a unique mechanism which consolidates the functions of a direct memory access and other data movement engines in a digital signal processor system (for example, cache controllers) into a single module.

Consolidation of such functions has both advantages and disadvantages. The most important advantage of consolidation is that it will, in general, save hardware since multiple instantiations of the same type of address generation hardware will not have to be implemented.

On a higher level, it is also advantageous to consolidate address generation since it inherently makes the design simpler to modify from a memory-map point of view. For example, if a peripheral is added or removed from the system, a consolidated module will be the only portion of the design requiring change. In a distributed address system (multi-channel direct memory access for example), all instances of the direct memory access channels would change, as would the digital signal processor memory controllers.

Fundamental disadvantages of the consolidated model, however, are its inherent bottlenecking, resulting from conflicting multiple requests, and its challenge to higher clock rates. Additionally, there is in general an added complexity associated with moving to a consolidated address model, just because the single module is larger than any of the individual parts it replaces.

The transfer controller with hub and ports, to which this invention relates, is a highly parallel and highly pipelined memory transaction processor. This transfer controller with hub and ports serves as a backplane to which many peripheral and/or memory ports may be attached.

SUMMARY OF THE INVENTION

The write request queue of this invention provides a means to prevent bottlenecking which would otherwise occur in a device capable of processing multiple data transfer requests simultaneously. This bottlenecking results from the occurrence of blocking transfers, i.e. when a transfer between ports A and B prevents a transfer from ports A and C from occurring. The present invention relies on write driven processing and provides a write request queue to store transfer requests which must be temporarily held while the transfer in process completes.

The transfer controller with hub and ports also includes a mechanism to eliminate this feature on ports which are fast enough to handle writes at up to the full speed of the transfer controller with hub and ports. In general, only the internal memory port of the transfer controller with hub and ports can support such writes at up to the full speed of the transfer controller with hub and ports. The transfer controller with hub and ports is independent of such writes, as it does not distinguish between the internal and the external ports and what physically resides on them. It simply performs read or write driven processing via a tie off at each port interface.

In write driven processing, the destination write drives the process. First the hub engine requests the destination to reserve some space for the data to be written. When this request is granted, the source read can occur. The actual destination write will occur in due course. The ability to store these requests in the write request queue supplies this capability.

BRIEF DESCRIPTION OF THE DRAWINGS

These and other aspects of this invention are illustrated in the drawings, in which:

FIG. 5 illustrates two write requests, the first in time proceeding from a port with higher latency A and the second in time proceeding from a port of lower latency B and the need to resolve the protocol when the data from the second request port B arrives first;

FIG. 6 illustrates the three part structure of the external ports interface units;

DETAILED DESCRIPTION OF PREFERRED EMBODIMENTS

Figure 1:
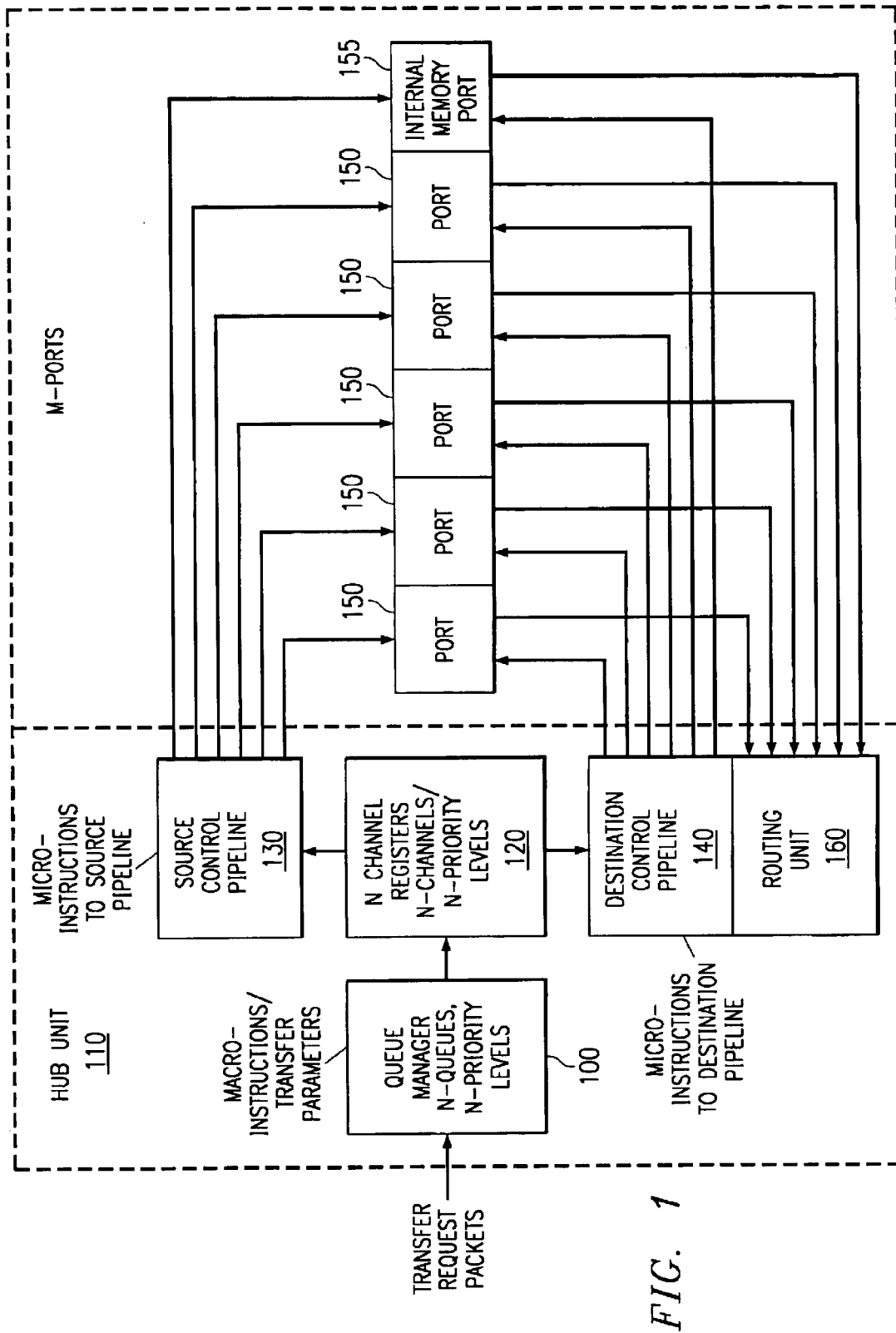
FIG. 1 illustrates a block diagram of the basic principal features of the transfer controller with hub and ports.

FIG. 1 illustrates a block diagram of the basic features of the transfer controller with hub and ports. The transfer controller with hub and ports is basically a data transfer controller which has at its front end portion, a queue manager 100 receiving, prioritizing, and dispatching data in the form of transfer request packets. This queue manager 100 connects within the hub unit 110 to the channel registers 120. Channel registers 120 receives the data transfer request packets and processes them first by prioritizing them and assigning them to one of the N channels. Each channel represents a priority level. These channel registers 120 interface with the source control pipeline 130 and destination control pipeline 140. These are address calculation units for source (read) and destination (write) operations.

Outputs from these pipelines are broadcast to M Ports (six shown in FIG. 1 as 150 through 155). The ports 150 to 155 are clocked either at the main processor clock frequency or at a lower external device clock frequency. Read data from one port, e.g. port 150, having a destination write address of port 153 is returned to the hub destination control pipeline through the routing unit.

The transfer controller with hub and ports, to which this invention relates, introduces several new ideas supplanting the previous transfer controller technology. First, it is uniformly pipelined. In the previous transfer controller designs, the pipeline was heavily coupled to the external memory type supported by the device. In the preferred embodiment, the transfer controller with hub and ports contains multiple external ports, all of which look identical to the hub. Thus peripherals and memory may be freely interchanged without affecting the transfer controller with hub and ports. Secondly, the transfer controller with hub and ports concurrently executes transfers. That is, up to N transfers may occur in parallel on the multiple ports of the device, where N is the number of channels in the transfer controller with hub and ports core. Each channel in the transfer controller with hub and ports core is functionally just a set of registers. These registers track the current source and destination addresses, the word counts and other parameters for the transfer. Each channel is identical, and thus the number of channels supported by the transfer controller with hub and ports is highly scalable. Thirdly, the transfer controller with hub and ports includes a mechanism for queuing transfers up in a dedicated queue RAM.

The transfer controller with hub and ports and its closely associated functional units, may be broken into five main entities (refer to FIG. 2):

(1) The request bus master 200 input takes in transfer request packets from the transfer request feed mechanism 201. These transfer requests originate from processor elements or other devices. These transfer request packets are input to the queue manager 220 which is within the transfer controller with hub and ports. A transfer request is a command (in the preferred embodiment the command word is of quad word length or double long word length, i.e. approximately 128 bits in length) to the transfer controller with hub and ports to move a specified number of data elements from one global address to another.

Figure 2:
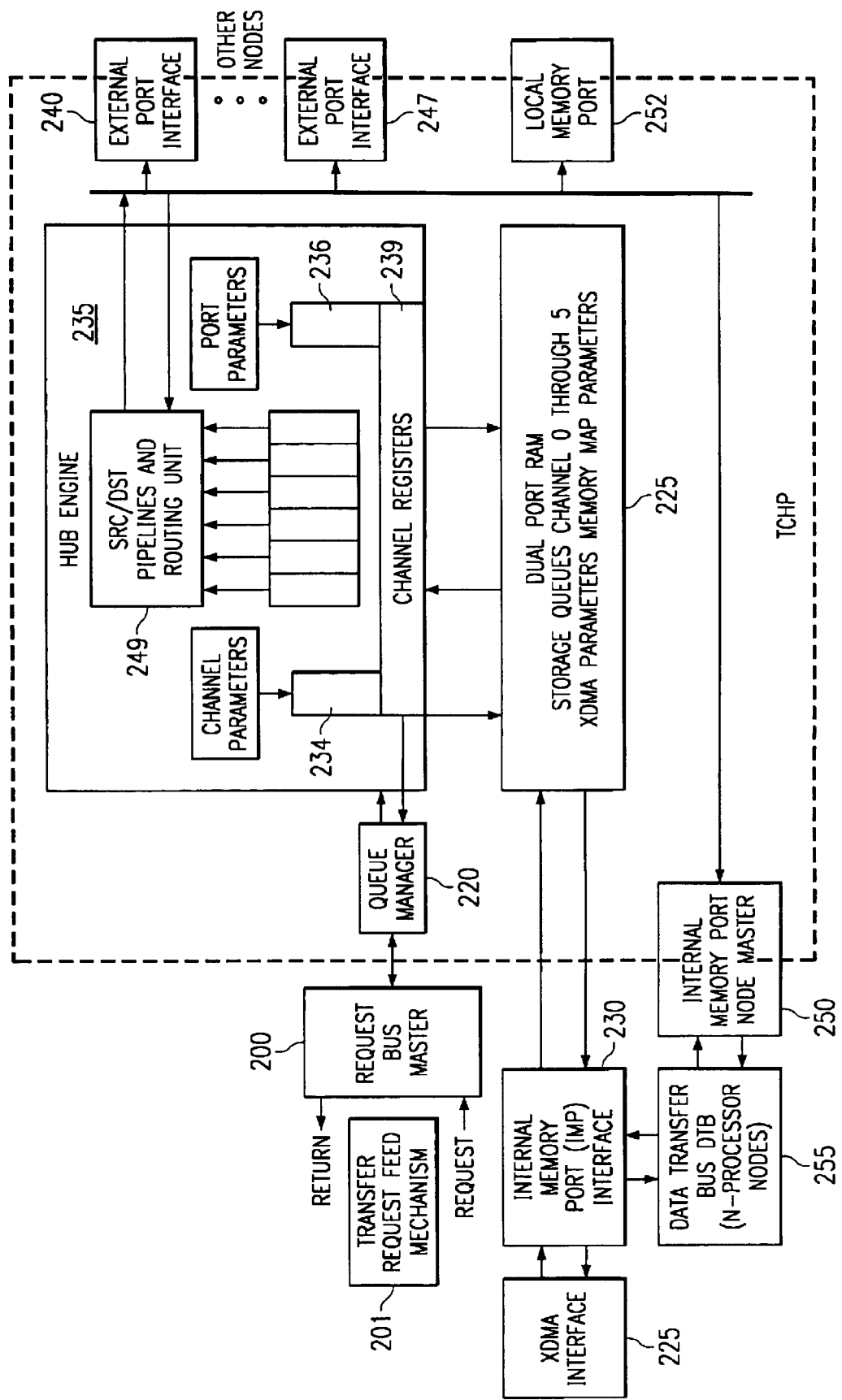
FIG. 2 illustrates the functional blocks of the transfer controller hub and its interface to external ports and internal memory port master.

(2) The transfer controller with hub and ports, shown within the dashed line of FIG. 2, includes queue manager 220, dual port RAM 225 queue storage, and the hub engine 235 with channel registers 239, source/destination pipelines and routing unit 249. Also illustrated are the channel parameters registers 234 and port parameters registers 236. The dashed line dissects the external ports interface units, indicating that the transfer controller with hub and ports proper, terminates within these ports. The hub engine 235 performs the servicing of the transfers, breaking them into smaller transfers that the devices can handle.

(3) The internal memory port (IMP) node master 250 is a special transfer controller with hub and ports port, interfaces to the data transfer bus (DTB) 255. The internal memory port node master 250 connects a port representing internal memory to the processor nodes. Processor nodes interfaces here include all distributed internal data memory and internal program memory controllers and to all the other control registers on the processor system.

(4) The data transfer bus (DTB) 255 connects the port representing internal memory to the memory interfaces in the digital signal processor nodes and other units in the core of the chip.

(5) The external ports interfaces 240 through 247 act as a buffer between the hub engine and the external memory or peripheral port.

Consider an example where a high priority transfer occurs between fast main external memory and a slow peripheral, such as a serial port and a lower priority transfer between the main external memory and the internal memory also occurs. Write driven processing is used to prevent occurrences of a backlog at a slow serial port which would result in a main memory read stall. In this situation according to the prior art the main memory would be able to pass data only at the same effective bandwidth as the slow serial port. During this stall, a lower priority external to internal memory transfer would not be able to proceed until the slow serial port transfer was complete.

With write driven processing, reads for data to be transferred to the serial port will be scheduled only if the serial port has room for them. The external memory will not need to stall because it has fetched data and has no location to which the data can be sent. As soon as the serial port can absorb no more data, the hub will be free to schedule transfers for the lower priority external to internal memory transfer until space for another transfer becomes available in the serial port. As the data transfer bandwidth of the serial port may be several orders of magnitude less than the external memory, a significant improvement in efficiency occurs.

Figure 3:
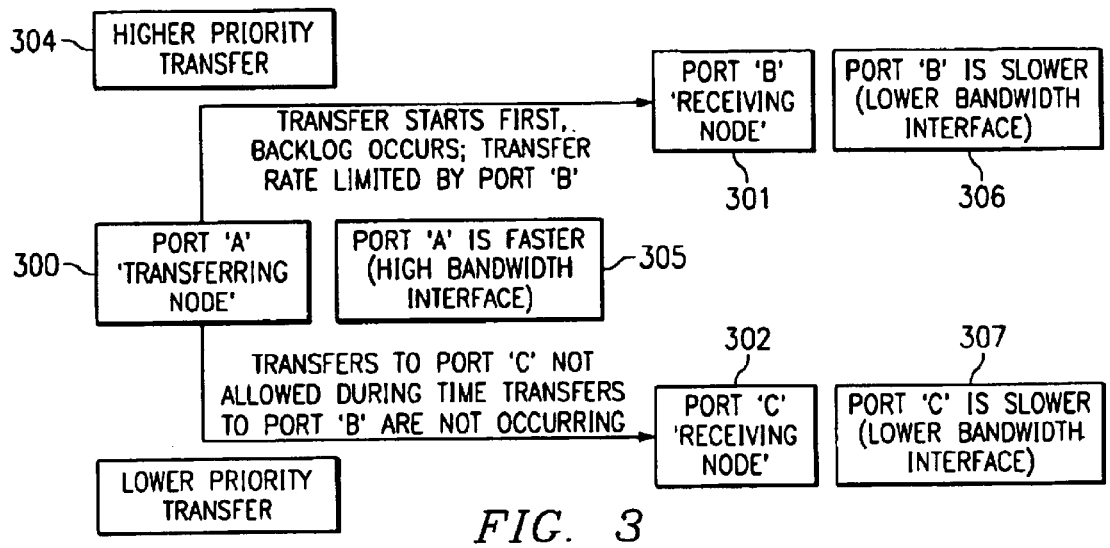
FIG. 3 illustrates two transfers operating concurrently, one between ports A and B (higher priority), and the second between ports A and C (lower priority)

Consider the following prior art example illustrated in FIG. 3. There are two transfers operating concurrently, one between ports A 300 and B 301, and another between ports A 300 and C 302. The transfer between port A 300 and port B 301 has a higher priority 304 than the transfer between port a 300 and port C 302. The interface at port A 300 has a higher bandwidth 305 than both the bandwidth 306 of port B 310 and the bandwidth 307 of port C 302. When the transfer from port A 300 to port B 301 starts up, data read from port A 300 backlogs within the device because port B 301 is slower than port A 300. New requests to port A 300 can only be submitted at the rate that port B 301 is clearing the backlog. The interface at port A 300 cannot be used for transfers between port A 300 and port C 302 during the times that the interface at port A 300 cannot be used for fetching data for port B 301. This is a blocking transfer. When transferring data from port A 300 to port B 301, the prior art approach is to read from port A 300, and when data is returned, pass it on to port B 301. However, if the interface at port A 300 has a higher bandwidth than that of port B 301, this can result in a large backlog of data requested from port A 300 which cannot yet be passed on to port B 301. If transfer controller is multitasking, this backlog can prevent the interface at port A 300 from being applied to another transfer, such as the lower priority from port A 300 to port C 302 concurrently as illustrated in FIG. 3.

In this invention, the use of a write request queue in conjunction with write driven processing prevents this blocking problem. In this invention, a write to port B 301 is requested before reading from port A 300. Data is read from port A 300 at the rate required to fulfill the data transfer rate of port B 301. No backlog occurs, and multitasking can occur effectively.

Figure 4:
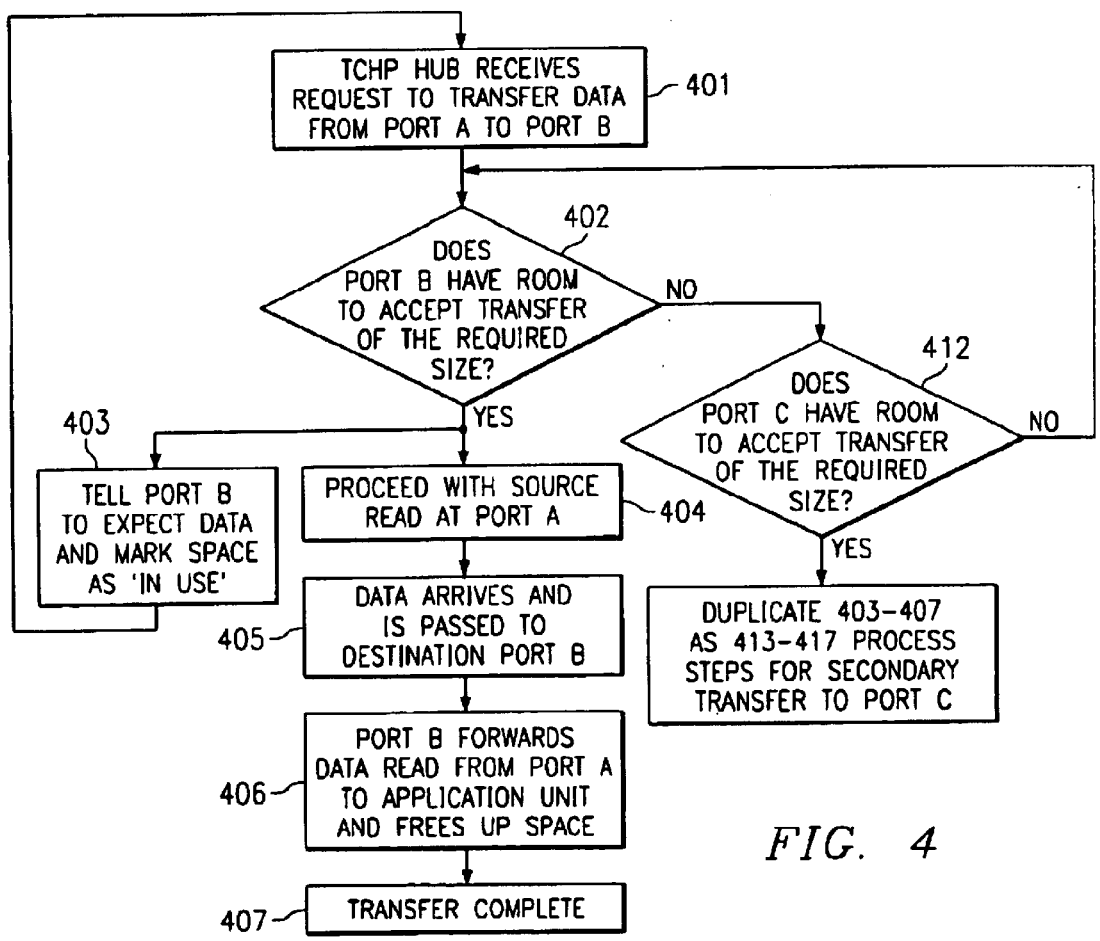
FIG. 4 illustrates the flow of the write driven process of this invention in which the data does not necessarily arrive in the same order as the requests.

The flow chart of FIG. 4 illustrates how the write request queue mechanism of this invention prevents such bottlenecks proceeds. In step 401, the transfer controller hub receives a data transfer request to move data from port A to port B. The transfer controller hub then interrogates port B to determine if it can accept a transfer of the required data size (step 402). If it can, the destination is told to expect the data and the space required for the data is marked as in use. This is in anticipation that the data won't actually arrive until later clock cycles (step 403). Once the transfer controller hub has established that the destination has reserved space for the data, the source read proceeds (step 404). When the data arrives, it is passed directly to the destination, port B (step 405). In step 406, port B forwards the data and frees up the space ready for the next transfer (step 407).

On the other hand, if the destination does not have space available, the device can attempt a different transfer instead. In step 412 a check is made to see if a transfer from port A to port C is pending. If so, and if port C can accept a transfer, then steps 403 through 407 are duplicated as steps 413 through 417 relative to port C. Note that this process should be repeated for all other possible destinations with port A as the source. If any transfers are pending from port A, these may be serviced during any interval when port B cannot receive data. If port C cannot accept a transfer, then control loops back to step 402.

The transfer controller hub of this invention includes a mechanism to limit the rate at which source data is read to the rate at which it can subsequently be written without introducing congestion in the data transfer engine (i.e. the hub). A write reservation station is needed on all ports, except those as fast as the transfer controller hub. In the preferred embodiment of the transfer controller with hub and ports, the fastest port is the internal memory port but any port could potentially be the fastest.

Generally a write reservation station is required for any port which has a write request queue. Whenever an entry is placed in the write request queue, the data for that write will arrive sometime later. On arrival this data goes into the reservation station. It is called a reservation station rather than a write data queue because the data does not necessarily arrive in the same order as the requests. This will be illustrated below.

Consider the example illustrated in FIG. 5. A first channel 501 is set up for a transfer between port A 502 and port C 504. A second channel 507 is set up for a transfer between port B 503 and port C 504. Port B 503 has a lower read latency 508 than the read latency of port A 502. That is, the time between a read request being made and data being returned is lower for port B 503 than port A 502. The first channel 501 services a write request to port C 504. Space is reserved for write data, and request is granted. A second channel 507 services a write request from port B 503 to port C 504. Again, space is reserved for write data and request is granted. The second channel 507 write request occurred after first channel 501 write request, the data from the second channel 507 read from port B 503 may arrive at port C 504 before data from first channel 501 read from port A 502 because of lower latency of port B 503. Thus the arrival order cannot be used to associate the data with the requests made earlier.

Write driven processing is applied only at the hub interface unit (HIU). This occurs at the generic or common front end of the external port interface units. This is where the reservation station and the write request queue will reside. Here, the request for the write will be made before the data to be written is present. This data will arrive later. However, this can all be hidden from application unit (AU), which is the back end of the external ports interface unit. The hub interface unit will not make a request to write to the application unit until the data arrives, at which point a conventional write request with data available can be made to the application unit.

FIG. 6 illustrates the three divisions of the external port interface units into generic front end (hub unit interface 601), synchronizer 602 and customized back end (application unit interface 603). The write request queue and write reservation station is contained wholly within the front end portion hub interface 601.

Figure 7:
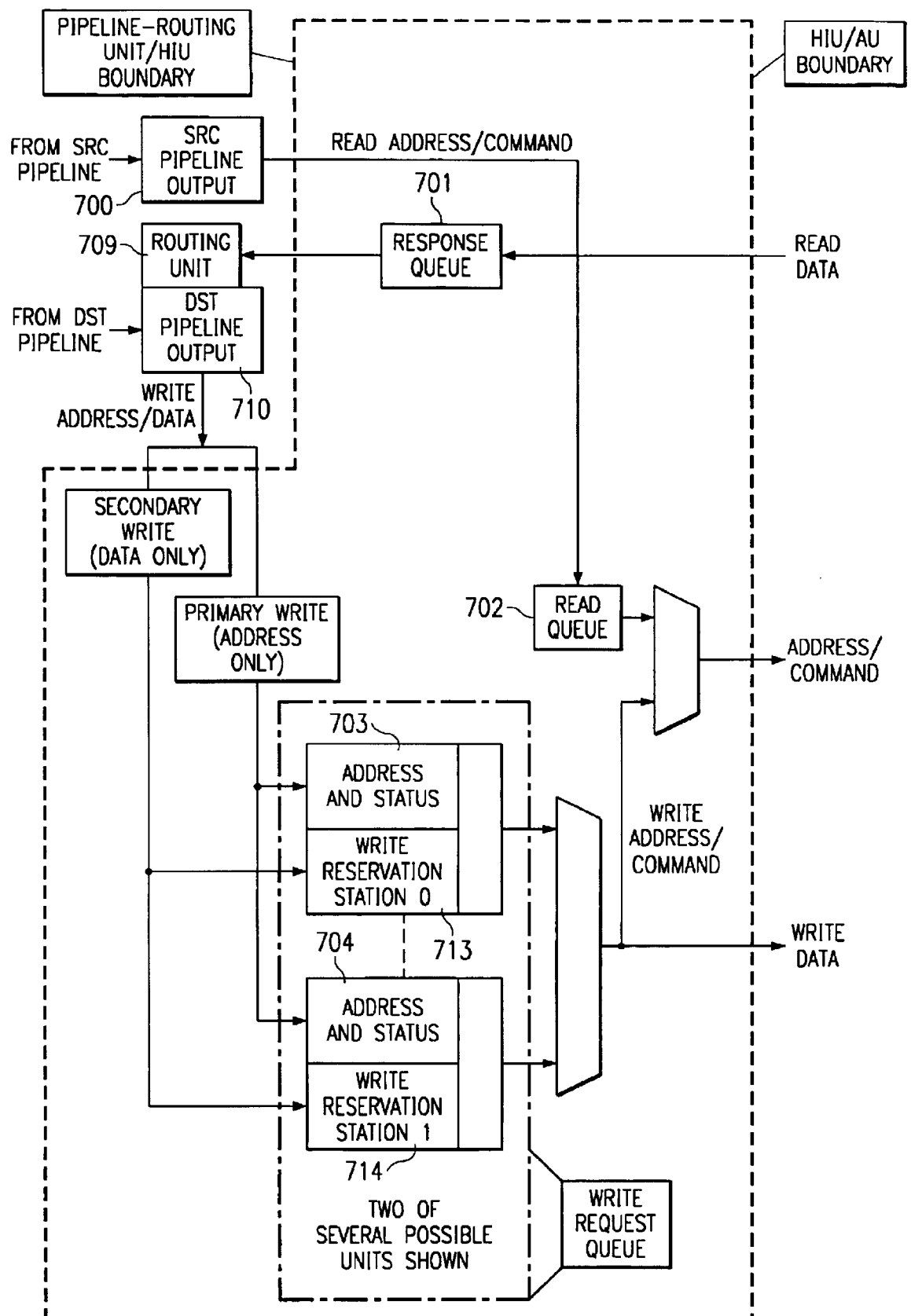
FIG. 7 illustrates a functional block diagram showing conceptually the hub interface unit and the write request queue of this invention.

FIG. 7 illustrates the write request queue as a portion of the generic front end hub interface unit. The write request queue within the dot-dashed lines consist of address and status registers 703 for write reservation station '0' 713 and address and status registers 704 for write reservation station '1' 714. The datapath of the write request queue consists of potentially a greater number of write reservation entries. In the example of FIG. 7 only two write reservation station entries are provided. The first is labeled write reservation station '0' 713 and the second is labeled write reservation station '1' 714.

The sequence in a write driven processing transfer of data proceeds as follows. Note that the hub interface unit portion of the port illustrated in FIG. 7 is the destination port in this example. The data transfer bus pipeline issues a ore-write command to the destination port. This is step 402 in FIG. 4, where the transfer controller hub interrogates the destination port to determine if it can accept a transfer of the required size. In FIG. 7, this proceeds to the address and status registers only, and is labeled a primary write. In executing this command, the hub interface unit stores an indication of the transfer, such as the channel number, data size, source or destination address and sequence number, in the address and status register 703 that is associated with write reservation station 713. Thus address and status register 703 serves as an identifier register for the corresponding write reservation station 713. If the transfer controller hub receives a 'yes' response indicating that the port can receive the data, this destination port is told to expect the data. The space required for the data in the write reservation station is marked as in use in anticipation of this data although the data won't actually arrive until later clock cycles.

Once the transfer controller hub has established that the destination has reserved space in write reservation station 713 for the data, the source read proceeds. This occurs at another port, the source port. The source pipeline output stage 700 issues a read command to the source port. When the data arrives via the path through the response queue (a path identical to response queue 701 in the source port) it is passed through the routing unit 710 and a secondary write is issued by the destination pipeline output stage 710. This secondary write contains the data to be written. This data is first written to write reservation station 713 in the reserved space in the destination port and then is passed from the hub interface unit as write data. Once this secondary write data is passed to the write request queue and write reservation station of the destination port, it is forwarded to the external application unit. Then space in the write reservation station is freed up and ready for the next transfer (steps 405 and 406 of FIG. 4). As noted earlier in FIG. 4, if the destination did not have space available, the transfer controller with hub and ports can attempt a different transfer instead.

When the hub interface unit accepts a pre-write command, it stores identifier data, such as channel number, data size, source or destination address or sequence number for example, in the address and status register 703 associated with write reservation station 713. When the transfer controller hub destination pipeline output 710 sends the write data to the port, the port checks the identifier data and determines the location to which to write the corresponding write reservation station entry. In this example, the associated write reservation station is write reservation station 713.

In the preferred embodiment the write request queue has a number of other requirements. The address and 2-bit size information are stored in a first in first out (FIFO) queue. A counter within the write reservation station counts the data received and compares it to the pre-write indicated data size. When the data received is equal to the pre-write data size, the data transfer from the transfer controller hub to the hub interface unit is completed and the data is ready to be transferred to the external device, also referred to as the application unit.

In summary, the data transfer is as follows. The hub interface unit performs a read operation and receives the data from an internal memory port (if the source is an internal memory device) or from another hub interface unit (if the source is a peripheral port application unit) via the transfer controller hub routing unit. It then performs a write function, transferring data to another of the transfer controller peripheral ports via the destination hub interface unit.

With write driven processing, data reads from a source port will be scheduled only if the destination port has room for the data. The source port will not need to stall because it has fetched data and has no location to send the data. As soon as the destination port can absorb no more data, the transfer controller hub will be free to schedule transfers for the lower priority transfers until space for another transfer becomes available in the original destination port. In this example the original destination port is a serial port. As the data transfer bandwidth of the serial port may be several orders of magnitude less than the data transfer bandwidth of other ports such as internal or external memory, a significant improvement in efficiency occurs. This invention uses a write request queue in conjunction with write driven processing. This invention prevents this problem by requesting the write to the destination port before reading from the source port. It results in data being read from the source at the rate required to fulfill the destination port. No backlog occurs, and multitasking can occur effectively.

Figure 8:
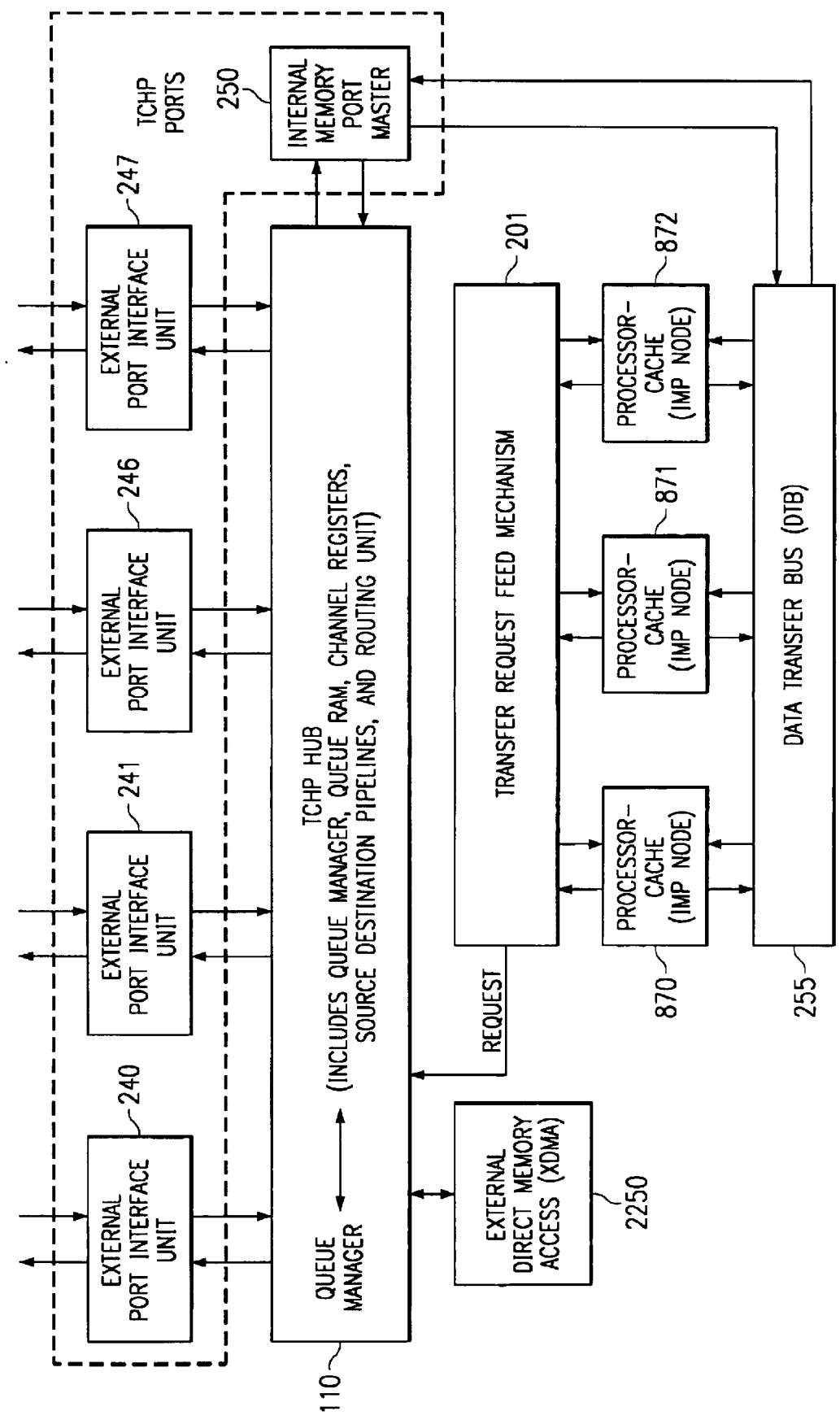
FIG. 8 illustrates a single integrated circuit including multiple processors and the transfer controller of this invention.

FIG. 8 illustrates from a higher level an overview of a multiprocessor integrated circuit employing the transfer controller with hub and ports of this invention. There are four main functional blocks. The transfer controller with hub and ports 110 and the ports including ports external port interface units 240 to 247 and internal memory port 250 are the first two main functional blocks. The other two main functional blocks are the transfer request feed mechanism 201 and the data transfer bus (DTB) 255. These are closely associated functional units that are but not a part of the transfer controller with hub and ports 110. Transfer request feed mechanism 201 is coupled to plural internal memory port nodes 870, 871 and 872. Each of these internal memory port nodes includes an independently programmable data processor, which may be a digital signal processor, and corresponding cache memory or other local memory. The internal construction of these internal memory port nodes is not important for this invention. For the purpose of this invention it is sufficient that each of the internal memory port nodes can submit transfer requests via transfer request feed mechanism 201 and has memory that can be a source or destination for data. Transfer request feed mechanism 201 prioritizes these packet transfer requests in a manner not relevant to this invention. Transfers originating from or destined for internal memory port nodes 870, 871 or 872 are coupled to transfer controller with hub and ports 110 via data transfer bus 255 and internal memory port master 250. As previously described, internal memory port master 250 may not require the write driven process of this invention if internal memory port nodes 870, 871 and 872 have memory transfer bandwidth equivalent to the memory transfer bandwidth of transfer controller with hub and ports 110. FIG. 8 highlights the possible connection of data transfer bus 255 to multiple internal memory port nodes 870, 871 and 872 and the possible connection of multiple transfer request nodes to transfer request feed mechanism 201. This represents an example of the mode of the use of the write driven process of this invention and not its only context of use.

Figure 9:
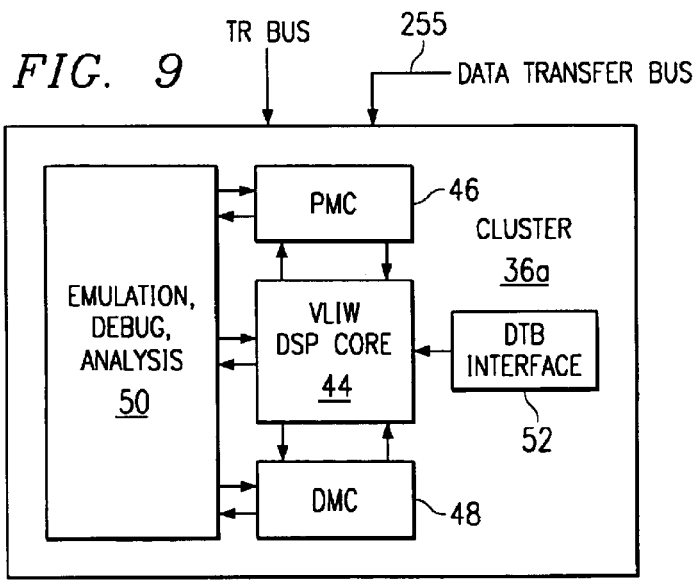
FIG. 9 illustrates a block diagram form an example of one of the multiple processors illustrated in FIG. 8.

FIG. 9 illustrates a block diagram of an example of a preferred processor and cache memory combination implementing the internal memory nodes 870, 871 and 872 of FIG. 8. Each internal memory node 870, 871 and 872 preferably includes a digital signal processor core and corresponding instruction and data cache memory. Transfer controller with hub and ports 110 provides for all data communication among internal memory nodes 870, 871 and 872, external input/output (I/O) devices and peripherals at external ports 240 to 247, and internal memory at local memory port 252. Each internal memory node 870, 871 and 872 preferably comprises a very long instruction word (VLIW) digital signal processor core 44, program memory controller (PMC) 46, data memory controller (DMC) 48, an emulation, test, analysis and debug block 50, local memory and data transfer bus (DTB) interface 52. Internal memory nodes 870, 871 and 872 and transfer controller with hub and ports 110 communicate over a pair of high throughput buses. Transfer request feed mechanism 201 is used by digital signal processor cores 44 to specify and request transactions in transfer controller with hub and ports 110. Data transfer bus (DTB) 255 is used to load and store data from objects in the global memory map. While any given digital signal processor core 44 can access its own internal local memory within the cluster without permission from transfer controller with hub and ports 110, any access to global memory outside of its local memory requires a transfer controller directed data transfer, whether the access is to external memory or to another digital signal processor local memory. The overall architecture is scalable, allowing for the implementation of many internal memory nodes, although three is currently the preferred embodiment. It should be noted that architectural details, such as the number of digital signal processor cores, and their instruction set architectures are not essential to the invention. This microprocessor architecture is exemplary only, and the invention is applicable to many microprocessor architectures.

Figure 10:
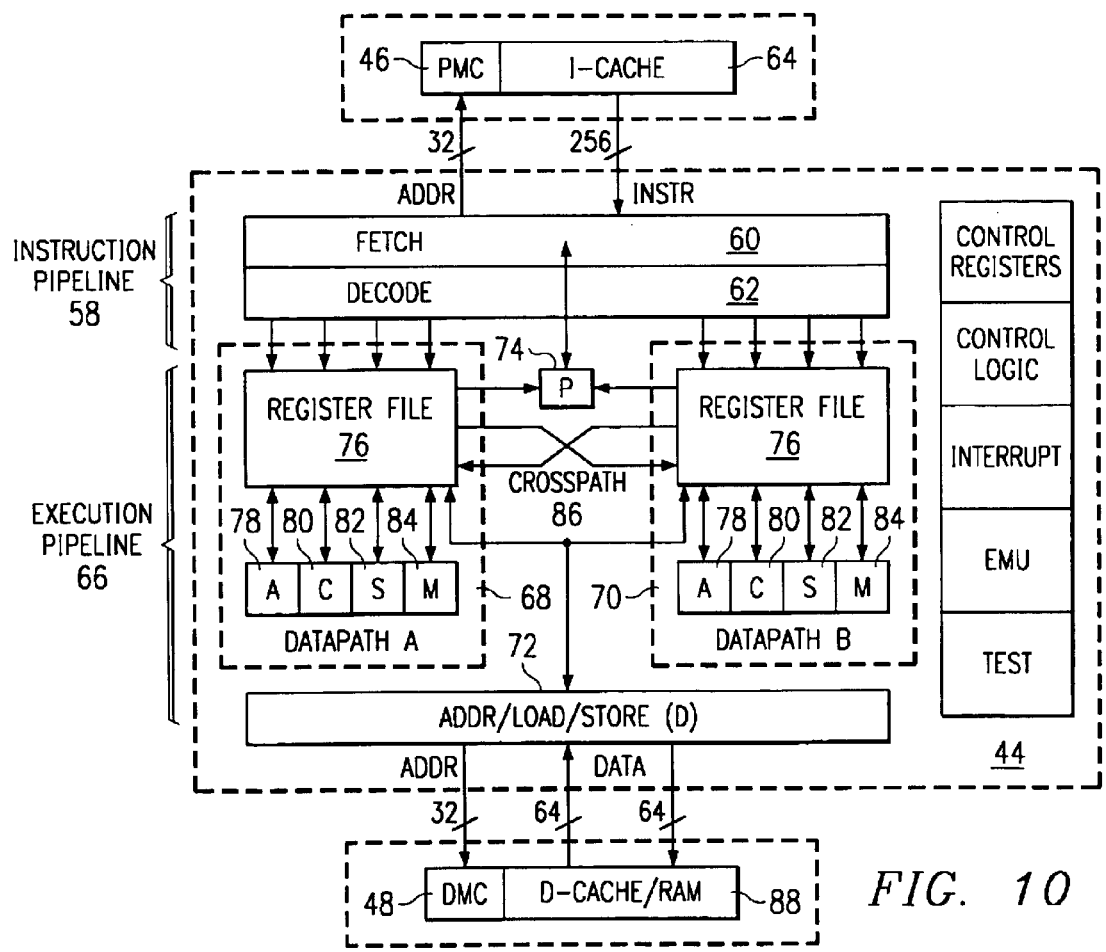
FIG. 10 illustrates further details of the very long instruction word digital signal processor core illustrated in FIG. 9.

FIG. 10 is a block diagram illustrating more detail of digital signal processor core 44 illustrated in FIG. 9. Digital signal processor core 44 is a 32-bit eight-way VLIW pipelined processor. The instruction set consists of fixed length 32-bit reduced instruction set computer (RISC) type instructions that are tuned for digital signal processing applications. Almost all instructions perform register-to-register operations and all memory accesses are performed using explicit load/store instructions. As shown in FIG. 10, instruction pipeline 58 consists of fetch stage 60 and decode stage 62. Fetch stage 60 retrieves program codes into the processor core from instruction cache 64 under control of program memory controller 46 in groups of eight instructions called a fetch packet. Decode stage 62 parses the fetch packet, determines parallelism and resource availability and constructs an execute packet of up to eight instructions. Each instruction in the execute packet is then translated into control signals to drive the appropriate units in execution pipeline 66. Execution pipeline 66 consists of two symmetrical datapaths, datapath A 68 and datapath B 70, a common 64-bit load/store unit group D-unit group 72, and a common branch unit group P-unit group 74. Each datapath contains 32-word register file (RF) 76, and four execution unit groups, A-unit group 78, C-unit group 80, S-unit group 82, and M-unit group 84. Overall there are ten separate unit groups in execution pipeline 66. Eight of these units may be scheduled concurrently every cycle. Each functional unit group contains plural functional units, some of which are duplicated between unit groups. In total there are nine 32-bit adders, four 32 bit shifters, three boolean operators, and two 32 bit by 16 bit multipliers. The multipliers are each configurable into two 16 bit by 16 bit multipliers or into four 8 bit by 8 bit multipliers. The memory at internal memory nodes 870, 871 and 872 is preferably partitioned between instruction cache memory 64 controlled via program memory controller 46 and data cache memory and random access memory 88 controlled via data memory controller 48. These memory partitions are employed by digital signal processor core 44 in a conventional manner.

Each digital signal processor core 44 may request data transfers in is several ways. Digital signal processor core 44 may issue a data transfer request to transfer controller with hub and ports 110 in response to an explicit data transfer instruction. The data transfer instruction must specify the data source, the data destination and the data amount. These specifications may be by immediate fields in the instructions or by parameters stored in registers or memory. It is preferable that each digital signal processor core 44 be capable of requesting any data transfer that can be serviced by transfer controller with hub and ports 110. Thus any digital signal processor core 44 may transfer data internally or externally and load or read any internal memory node.

Each digital processor core 44 preferably also includes automatic mechanisms for generating requests for data transfer for cache service. Thus an instruction cache miss preferably causes program memory controller 46 to generate a data transfer request from another data source to fill a line of instruction cache 64 with data including program instructions stored at the address generating the cache miss. Similarly, a data cache miss on a data read preferably causes data memory controller 48 to generate a data transfer request to retrieve data to fill a line in data cache/random access memory 88 with corresponding data. These instruction and data are stored in a higher level of memory. This higher level of memory may be an on-chip combined cache used by all digital signal processor cores 44 or it may be external to the multiprocessor integrated circuit. There are two alternatives for data cache misses on data writes. In a write through mode, a data write by digital processor core 44 that misses data cache/random access memory 88 causes data memory controller 48 to generate a data transfer request to store the write data in the appropriate location in a higher level of memory. In a writeback mode, a data write by digital processor core 44 that misses data cache/random access memory 88 causes data memory controller 48 to generate a data transfer request to recall corresponding data in the appropriate location from a higher level of memory for storage in data cache/random access memory 88. The write data is then written into data cache/random access memory 88 overwriting the corresponding data just recalled from the higher level of memory. This process is referred to as write allocation within the data cache.

Data memory controller 48 preferably also employs a data transfer request to handle data writeback to a higher level memory upon cache eviction of a dirty entry. A dirty cache entry includes data that has been modified since it was recalled from a higher level of memory. This modified data corresponds to a later state of the program than the data stored in the higher level of memory. When such data must be replaced to make room for new cache data, referred to as cache eviction, this dirty data must be written back to the higher level of memory to maintain the proper program state. Transfer controller with hub and ports 110 is preferably employed for this writeback of evicted dirty cache entries.

What is claimed is:

1. A method of data transfer between a source port and a destination port of a transfer controller with plural ports, said method comprising the steps of:

in response to a data transfer request, querying said destination port to determine if said destination port is capable of receiving data of a predetermined size;

if said destination port is not capable of receiving data of said predetermined size, waiting by not reading data of said predetermined size from said source port corresponding to said data transfer request, not storing data read from said source port in intermediate buffers and not transferring data to said destination port thereby not blocking reading data from said source port until said destination port is capable of receiving data;

if said destination port is capable of receiving data of said predetermined size, reading data of said predetermined size from said source port and transferring said read data to said destination port; and while waiting until said destination port is capable of receiving data
determining if a second data transfer request is pending between said source port and a second destination port, and
if a second data transfer request is pending
querying said second destination port to determine if said second destination port is capable of receiving data of said predetermined size,
if said second destination port is not capable of receiving data of said predetermined size, waiting by not reading data of said predetermined size from said source port corresponding to said second data transfer request, not storing data read from said source port in intermediate buffers and not transferring data to said second destination port thereby not blocking reading data from said source port until said second destination port is capable of receiving data, and
if said second destination port is capable of receiving data of said predetermined size, reading data of said predetermined size from said source port and transferring said read data to said second destination port.

2. The method of claim 1, wherein each port includes at least one write reservation station, said method wherein:
said step of querying said destination port includes:
determining whether any write reservation station capable of storing data of said predetermined size of said destination port has not been allocated for receipt of data,
if at least one write reservation capable of storing data of said predetermined size is not allocated for receipt of data, determining said destination port can receive data and allocating a write reservation station capable of storing data of said predetermined size for receipt of data; and
said step of transferring said read data to said destination port includes transferring said read data to said allocated write reservation station of said destination port.

3. The method of claim 2, further comprising:
transferring data from a write reservation station storing data to be transferred to an application unit coupled to said destination port at a data transfer rate of said application unit; and
disallocating said write reservation station upon transfer of data to said application unit.

4. The method of claim 2, wherein:
said step of allocating a write reservation station includes storing a data identifier corresponding to said write reservation station; and said step of transferring said read data to said destination port includes storing said read data in a write reservation station having a data identifier corresponding to said read data.

5. A data transfer controller comprising:
a request queue controller receiving, prioritizing and dispatching data transfer requests, each data transfer request specifying a data source, a data destination and a data quantity to be transferred;
a data transfer hub connected to request queue controller effecting dispatched data transfer requests;
a plurality of ports, each of said plurality of ports having an interior interface connected to said data transfer hub and an exterior interface configured for an external memory/device expected to be connected to said port, said interior interface and said exterior interface operatively connected for data transfer therebetween; and
said data transfer hub controlling data transfer from a source port corresponding to said data source to a destination port corresponding to said data destination in a quantity corresponding to said data quantity to be transferred of a currently executing data transfer request, said data transfer hub further controlling said source port and said destination port to
in response to a data transfer request, query said destination port to determine if said destination port is capable of receiving data of a predetermined size,
if said destination port is not capable of receiving data of said predetermined size, waiting by not reading data of said predetermined size from said source port corresponding to said data transfer request and not transferring data to said destination port thereby not blocking reading data from said source port until said destination port is capable of receiving data,
if said destination port is capable of receiving data of said predetermined size, reading data of said predetermined size from said source port and transferring said read data to said destination port, and
said data transfer hub further capable while waiting until said destination port is capable of receiving data of
determining if a second data transfer request between said source port and a second destination port is pending,
if a second data transfer request is pending
querying said second destination port to determine if said second destination port is capable of receiving data of said predetermined size,
if said second destination port is not capable of receiving data of said predetermined size, waiting by not reading data of said predetermined size from said source port corresponding to said second data transfer request thereby not blocking reading data from said source port until said second destination port is capable of receiving data, and
if said second destination port is capable of receiving data of said predetermined size, reading data of said predetermined size from said source port and transferring said read data to said second destination port.

6. The data transfer controller of claim 5, wherein:
each port includes at least one write reservation station for storing data prior to transfer to said corresponding external memory/device;
said data transfer hub further controlling said destination port to determine whether any write reservation station capable of storing data of said predetermined size of said destination port has not been allocated for receipt of data, if at least one write reservation capable of storing data of said predetermined size is not allocated for receipt of data, determining said destination port can receive data and allocating a write reservation station capable of storing data of said predetermined size for receipt of data, and transfer said read data to said allocated write reservation station of said destination port.

7. The data transfer controller of claim 6, wherein:

said data transfer hub further controlling said destination port to transfer data from a write reservation station to said corresponding external memory/device at a data transfer rate of said external memory/device, and disallocating said write reservation station upon transfer of data from said write reservation station to said external memory/device.

8. The data transfer controller of claim 6, wherein:

each of said plurality of ports further includes an identifier register corresponding to each write reservation station; and said data transfer hub further controlling said destination port to allocate a write reservation station by writing identifier data in said corresponding identifier register, and store said read data in a write reservation station having a corresponding identifier stored in said identifier register corresponding to said write reservation station.

9. A data processing system comprising:

a plurality of data processors, each data processor capable of generating a data transfer request;

a request queue controller connected to said plurality of data processors, said request queue controller receiving, prioritizing and dispatching data transfer requests, each data transfer request specifying a data source, a data destination and a data quantity to be transferred;

a data transfer hub connected to request queue controller effecting dispatched data transfer requests;

a plurality of ports, each of said plurality of ports having an interior interface connected to said data transfer hub identically configured for each port and an exterior interface configured for an external memory/device expected to be connected to said port, said interior interface and said exterior interface operatively connected for data transfer therebetween; and said data transfer hub controlling data transfer from a source port corresponding to said data source to a destination port corresponding to said data destination in a quantity corresponding to said data quantity to be transferred of a currently executing data transfer request, said data transfer hub further controlling said source port and said destination port to in response to a data transfer request, query said destination port to determine if said destination port is capable of receiving data of a predetermined size, if said destination port is not capable of receiving data of said predetermined size, waiting by not reading data of said predetermined size from said source port corresponding to said data transfer request and not transferring data to said destination port thereby not blocking reading data from said source port until said destination port is capable of receiving data, if said destination port is capable of receiving data of said predetermined size, reading data of said predetermined size from said source port and transferring said read data to said destination port, and said data transfer hub further capable while waiting until said destination port is capable of receiving data of determining if a second data transfer request between said source port and a second destination port is pending, if a second data transfer request is pending querying said second destination port to determine if said second destination port is capable of receiving data of said predetermined size, if said second destination port is not capable of receiving data of said predetermined size, waiting by not reading data of said predetermined size from said source port corresponding to said second data transfer request thereby not blocking reading data from said source port until said second destination port is capable of receiving data, and if said second destination port is capable of receiving data of said predetermined size, reading data of said predetermined size from said source port and transferring said read data to said second destination port.

10. The data processing system of claim 9, wherein:

each port includes at least one write reservation station for storing data prior to transfer to said corresponding external memory/device;

said data transfer hub further controlling said destination port to determine whether any write reservation station capable of storing data of said predetermined size of said destination port has not been allocated for receipt of data, if at least one write reservation capable of storing data of said predetermined size is not allocated for receipt of data, determining said destination port can receive data and allocating a write reservation station capable of storing data of said predetermined size for receipt of data, and transfer said read data to said allocated write reservation station of said destination port.

11. The data processing system of claim 10, wherein:

said data transfer hub further controlling said destination port to transfer data from a write reservation station to said corresponding external memory/device at a data transfer rate of said external memory/device, and disallocate said write reservation station upon transfer of data from said write reservation station to said external memory/device.

12. The data processing system of claim 10, wherein:

each of said plurality of hubs further includes an identifier register corresponding to each write reservation station; and said data transfer hub further controlling said destination port to allocate a write reservation station by writing identifier data in said corresponding identifier register, and store said read data in a write reservation station having a corresponding identifier stored in said identifier register corresponding to said write reservation station.

13. The data processing system of claim 9, further comprising:

said plurality of ports includes an internal port master;

a data transfer bus connected to said internal port master and each of said data processors, said data transfer bus transferring data between said plurality of data processors and said data transfer hub via said internal port master;

a system memory connected to a predetermined one of said plurality of ports; and wherein each of said data processors includes an instruction cache connected to said data transfer bus for temporarily storing program instructions controlling said data processor, said data processor generating a data transfer request to said request queue controller for instruction cache fill from said system memory to said instruction cache upon a read access miss to said instruction cache.

14. The data processing system of claim 9, further comprising:

said plurality of ports includes an internal port master;

a data transfer bus connected to said internal port master and each of said data processors, said data transfer bus transferring data between said plurality of data processors and said data transfer hub via said internal port master;

a system memory connected to a predetermined one of said plurality of ports; and wherein each of said data processors includes a data cache connected to said data transfer bus for temporarily storing data employed by said data processor, said data processor generating a data transfer request to said request queue controller for data cache fill from said system memory to said data cache upon a read access miss to said data cache.

15. The data processing system of claim 9, further comprising:

said plurality of ports includes an internal port master;

a data transfer bus connected to said internal port master and each of said data processors, said data transfer bus transferring data between said plurality of data processors and said data transfer hub via said internal port master;

a system memory connected to a predetermined one of said plurality of ports; and wherein each of said data processors includes a data cache connected to said data transfer bus for temporarily storing data employed by said data processor, said data processor generating a data transfer request to said request queue controller for data writeback from said data cache to said system memory upon a write miss to said data cache.

16. The data processing system of claim 9, further comprising:

said plurality of ports includes an internal port master;

a data transfer bus connected to said internal port master and each of said data processors, said data transfer bus transferring data between said plurality of data processors and said data transfer hub via said internal port master;

a system memory connected to a predetermined one of said plurality of ports; and wherein each of said data processors includes a data cache connected to said data transfer bus for temporarily storing data employed by said data processor, said data processor generating a data transfer request to said request queue controller for write data allocation from said system memory to said data cache upon a write miss to said data cache.

17. The data processing system of claim 9, further comprising:

said plurality of ports includes an internal port master;

a data transfer bus connected to said internal port master and each of said data processors, said data transfer bus transferring data between said plurality of data processors and said data transfer hub via said internal port master;

a system memory connected to a predetermined one of said plurality of ports; and wherein each of said data processors includes a data cache connected to said data transfer bus for temporarily storing data employed by said data processor, said data processor generating a data transfer request to said request queue controller for data writeback from said data cache to said system memory upon eviction of dirty data from said data cache.

18. The data processing system of claim 9, wherein:

said plurality of data processors, said request queue controller, said data transfer hub and said plurality of ports are disposed on a single integrated circuit.

19. The data processing system of claim 9, further comprising:

a data memory having a data transfer bandwidth on the same order as a data transfer bandwidth of said data transfer hub;

an internal memory port connected to said data transfer hub and said data memory; and said data transfer hub further controlling said source port and said destination port to not query said internal memory port to determine if said destination port is capable of receiving data of a predetermined size, read data of said predetermined size from said source port and transfer said read date to said destination port via said data transfer hub if said internal memory port is a destination port of a data transfer request.

* * * * *